United States Patent
Chopra et al.

(10) Patent No.: US 12,478,287 B2
(45) Date of Patent: Nov. 25, 2025

(54) SYSTEM AND METHOD FOR DETERMINING LIFESTYLE REGIME

(71) Applicant: HEALTH ARX TECHNOLOGIES PVT. LTD., New Delhi (IN)

(72) Inventors: Gautam Chopra, New Delhi (IN); Yash Sehgal, New Delhi (IN)

( * ) Notice: Subject to any disclaimer, the term of this patent is extended or adjusted under 35 U.S.C. 154(b) by 174 days.

(21) Appl. No.: 17/279,794

(22) PCT Filed: Mar. 2, 2020

(86) PCT No.: PCT/IB2020/051743
§ 371 (c)(1),
(2) Date: Mar. 25, 2021

(87) PCT Pub. No.: WO2020/178705
PCT Pub. Date: Sep. 10, 2020

(65) Prior Publication Data
US 2021/0386332 A1  Dec. 16, 2021

(30) Foreign Application Priority Data
Mar. 5, 2019  (IN) .............................. 201911008559

(51) Int. Cl.
*A61B 5/145* (2006.01)
*A61B 5/00* (2006.01)
(Continued)

(52) U.S. Cl.
CPC ........ *A61B 5/14532* (2013.01); *A61B 5/7475* (2013.01); *G16H 20/10* (2018.01);
(Continued)

(58) Field of Classification Search
CPC .............. A61B 5/14532; A61B 5/7475; A61B 2560/0252; A61B 2562/0271;
(Continued)

(56) References Cited

U.S. PATENT DOCUMENTS 5,533,509 A * 7/1996 Koashi ................. A61B 5/7239
356/41
6,602,469 B1 * 8/2003 Maus ..................... G16H 10/60
422/68.1
(Continued)

FOREIGN PATENT DOCUMENTS

AU  2017200785 A1  3/2017

OTHER PUBLICATIONS

Notification of Transmittal of the International Search Report and the Written Opinion of the International Searching Authority mailed in PCT Application No. PCT/IB2020/051743 on Jul. 3, 2020, 9 pages.
Written opinion of the International Preliminary Examining Authority mailed in PCT Application No. PCT/IB2020/051743 on May 20, 2021, 5 pages.

*Primary Examiner* — Alex M Valvis
*Assistant Examiner* — Jonathan M Haney
(74) *Attorney, Agent, or Firm* — RC Trademark Company (57) ABSTRACT

Disclosed is system (100) for determining lifestyle regime for user, the system comprising: user device (102, 204, 300) comprising user agent module, wherein user agent module is configured to generate user interface (302), and receive user input data from user; blood glucose measuring device (104, 202) communicably coupled to user device for operation, blood glucose measuring device comprising electronic strip port for generating electronic signal; temperature sensor for sensing ambient temperature; and control unit configured to compute blood glucose level based on electronic signal and ambient temperature, data aggregating arrangement (106, 208) communicably coupled to user device for receiving blood glucose level and user input data provided by user agent module, and to process blood glucose level and user input data using one or more algorithms to determine lifestyle regime for user and display lifestyle regime on user interface of user device.

10 Claims, 4 Drawing Sheets

(51) Int. Cl.
  *G16H 20/10* (2018.01)
  *G16H 20/30* (2018.01)
  *G16H 20/60* (2018.01)

(52) U.S. Cl.
  CPC ............. *G16H 20/30* (2018.01); *G16H 20/60* (2018.01); *A61B 2560/0252* (2013.01); *A61B 2562/0271* (2013.01); *A61B 2562/0295* (2013.01)

(58) Field of Classification Search
  CPC ........... A61B 2562/0295; G16H 20/30; G16H 20/10; G16H 20/60
  See application file for complete search history.

(56) References Cited

U.S. PATENT DOCUMENTS

| | | | |
|---|---|---|---|
| 6,656,114 B1 * | 12/2003 | Poulsen | G16H 20/17 128/920 |
| 8,649,997 B2 | 2/2014 | Farrell et al. | |
| 8,812,244 B2 | 8/2014 | Angelides | |
| 2015/0190098 A1 * | 7/2015 | Patek | A61B 5/7278 600/365 |
| 2016/0217266 A1 | 7/2016 | Damani et al. | |
| 2017/0000349 A1 * | 1/2017 | Krief | A61B 5/150358 |
| 2018/0129785 A1 * | 5/2018 | Pal | A61B 5/0002 |
| 2018/0277246 A1 * | 9/2018 | Zhong | A61B 5/746 |

* cited by examiner

SYSTEM AND METHOD FOR DETERMINING LIFESTYLE REGIME

TECHNICAL FIELD

The present disclosure relates generally to providing assistances to stay healthy; and more specifically, to systems and methods for determining lifestyle regime for users.

BACKGROUND

Over the years with change in lifestyle, people have become prone to several diseases such as metabolic disorders. Generally, patients with diseases like diabetes require continuous diagnosis and assistance to stay healthy. Typically, diabetic patients regularly visit doctors for assistances that includes medical and lifestyle recommendations to maintain a healthy blood glucose level.

Conventionally, lifestyle recommendations are based on inputs provided by the patient. Such inputs include information such as nutrients consumed, calories burnt, steps walked, physiological condition and the like. However, the conventional process of providing lifestyle recommendations is largely dependent on the patients manually providing or inputting the information. Therefore, such technique of providing lifestyle recommendations is inherently flawed as it is dependent on manual intervention of the patients. Consequently, the process of generating the lifestyle recommendations is inefficient and ambiguous. Moreover, readings from electronic device, used to monitor the physiological conditions of the patients are manually provided or entered to generate lifestyle recommendations. For example, electronic device such as glucometer are used to measure blood glucose level in the patient. However, operating such conventional electronic device is cumbersome. For example, the conventional glucometer requires large electric batteries making the glucometer bulky and unfriendly. Moreover, the conventional glucometer displays information in a condensed form owing to the small size of its display.

Therefore, in light of the foregoing discussion, there exists a need to overcome the aforementioned drawbacks associated with providing life style recommendation to the user.

SUMMARY

The present disclosure seeks to provide a system for determining a lifestyle regime for a user. The present disclosure also seeks to provide a method for determining a lifestyle regime for a user. The present disclosure seeks to provide a solution to the existing problem of determining lifestyle regime based on manual intervention by the user. An aim of the present disclosure is to provide a solution that overcomes at least partially the problems encountered in prior art, and provides system for determining lifestyle regime with least dependency on manual intervention.

In one aspect, an embodiment of the present disclosure provides a system for determining a lifestyle regime for a user, the system comprising:
- a user device comprising a user agent module, wherein the user agent module is configured to generate a user interface to be displayed on a screen of the user device, and receive user input data from the user;
- a blood glucose measuring device communicably coupled to the user device for operation, wherein the blood glucose measuring device comprising
  - an electronic strip port for generating an electronic signal based on an electrochemical reaction occurring on a biochemical strip removably coupled therein;
  - a temperature sensor for sensing ambient temperature; and
  - a control unit configured to compute a blood glucose level based on the electronic signal received from the electronic strip port and the ambient temperature received from the temperature sensor,
  - wherein the control unit is further configured to provide the user device with the blood glucose level to be displayed on the user interface; and
- a data aggregating arrangement communicably coupled to the user device for receiving the blood glucose level and the user input data provided by the user agent module, and to process the blood glucose level and the user input data using one or more algorithms to determine the lifestyle regime for the user and display the lifestyle regime on the user interface of the user device.

In another aspect, an embodiment of the present disclosure provides a method for determining a lifestyle regime for a user, the method being implemented via a system comprising:
- a user device comprising a user agent module, wherein the user agent module is configured to generate a user interface to be displayed on a screen of the user device, and receive user input data from a corresponding user;
- blood glucose measuring device communicably coupled to the user device for operation, wherein the blood glucose measuring device comprising
  - an electronic strip port for generating an electronic signal based on an electrochemical reaction occurring on the biochemical strip removably coupled therein;
  - a temperature sensor for sensing ambient temperature; and
  - a control unit configured to compute a blood glucose level based on the electronic signal received from the electronic strip port, and the ambient temperature received from the temperature sensor,
  - wherein the control unit is further configured to provide the user device with the blood glucose level to be displayed on the user interface; and
- a data aggregating arrangement communicably coupled to the user device for receiving the blood glucose level and the user input data provided by the user agent module, and to process the blood glucose level and the user input data using one or more algorithms to determine the lifestyle regime for the user and display the lifestyle regime on the user interface of the user device.

Embodiments of the present disclosure substantially eliminate or at least partially address the aforementioned problems in the prior art, and enables an efficient and accurate determination of lifestyle regime with least dependency on manual intervention of the user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognise that other embodiments for carrying out or practicing the present disclosure are also possible.

In one aspect, an embodiment of the present disclosure provides a system for determining a lifestyle regime for a user, the system comprising:
  a user device comprising a user agent module, wherein the user agent module is configured to generate a user interface to be displayed on a screen of the user device, and receive user input data from the user;
  a blood glucose measuring device communicably coupled to the user device for operation, wherein the blood glucose measuring device comprising
    an electronic strip port for generating an electronic signal based on an electrochemical reaction occurring on a biochemical strip removably coupled therein;
    a temperature sensor for sensing ambient temperature; and
    a control unit configured to compute a blood glucose level based on the electronic signal received from the electronic strip port and the ambient temperature received from the temperature sensor,
    wherein the control unit is further configured to provide the user device with the blood glucose level to be displayed on the user interface; and
  a data aggregating arrangement communicably coupled to the user device for receiving the blood glucose level and the user input data provided by the user agent module, and to process the blood glucose level and the user input data using one or more algorithms to determine the lifestyle regime for the user and display the lifestyle regime on the user interface of the user device.

In another aspect, an embodiment of the present disclosure provides a method for determining a lifestyle regime for a user, the method being implemented via a system comprising:
  a user device comprising a user agent module, wherein the user agent module is configured to generate a user interface to be displayed on a screen of the user device, and receive user input data from a corresponding user;
  blood glucose measuring device communicably coupled to the user device for operation, wherein the blood glucose measuring device comprising
    an electronic strip port for generating an electronic signal based on an electrochemical reaction occurring on the biochemical strip removably coupled therein;
    a temperature sensor for sensing ambient temperature; and
    a control unit configured to compute a blood glucose level based on the electronic signal received from the electronic strip port, and the ambient temperature received from the temperature sensor,
    wherein the control unit is further configured to provide the user device with the blood glucose level to be displayed on the user interface; and
  a data aggregating arrangement communicably coupled to the user device for receiving the blood glucose level and the user input data provided by the user agent module, and to process the blood glucose level and the user input data using one or more algorithms to determine the lifestyle regime for the user and display the lifestyle regime on the user interface of the user device.

The present disclosure provides a system for providing lifestyle recommendations to patients. The system comprises the user device and the blood glucose measuring device. The user device is configured to receive inputs from patient and the blood glucose measuring device is configured to compute blood glucose level of the patient. The system employs the blood glucose level and the inputs from the patient to provide lifestyle recommendations to the patient. The blood glucose level is directly provided by the blood glucose measuring device to the user device without the patient manually providing or entering the blood glucose level on the user device. Consequently, the process of generating the lifestyle recommendations by the system is efficient and accurate. The blood glucose measuring device is dependent on the user device for providing power for its operation. The blood glucose measuring device does not employ large electric batteries and thereby is compact, light in weight and portable. The lifestyle recommendations are provided to the patient in an elaborated form on the screen of the user device.

The present disclosure provides the system for determining the lifestyle regime for the user. The system is a collection of one or more interconnected programmable and/or non-programmable components configured to determine the lifestyle regime for the user. Examples include programmable and/or non-programmable components, such as processors, memories, connectors, cables and the like. Moreover, the programmable components are configured to store and execute one or more computer instructions. Throughout the present disclosure, the term 'user' as used herein refers to any entity comprising a person (i.e., human being) using the system described herein. Specifically, user refers to a patient suffering from any one of: an illness, a disease, a disorder, and an ailment. In other words, the user may be a person requiring a medical care or a person receiving the medical care or a person awaiting treatment from a physician or a person under medical supervision from a medically trained person. In an example, a user is a person generally having abnormal blood glucose levels. In such an instance, the user may be termed as a diabetic person.

Furthermore, in the present disclosure, the term regime refers to information including a scheme of conduct/treatment that when adhered to, aids the user to maintain a healthy condition. The regime includes information related to the beginning, continuing and/or cessation of one or more activities in the everyday routine of the user. Examples of one or more activities may include engaging in physical activity, intaking of food, administering a therapeutic agent and the like. The lifestyle regime for the user refers to information including scheme of conduct/treatment that is maintained by the user in their everyday routine to retain or attain healthy condition. In an example, the lifestyle regime may include information of scheme of conduct/treatment for a user having abnormal blood glucose levels. In such example, adhering to scheme of conduct/treatment may help the user attain normal blood glucose levels, such as less than 100 mg/dL (during fasting for at least eight hours) and less than 140 mg/dL (two hours after eating).

The system comprises the user device. The user device is any computing device associated with (or used by) the user that is capable of enabling the user to perform specific tasks associated with the aforementioned system. Furthermore, the user device is intended to be broadly interpreted to comprise any electronic device that is used for voice and/or data communication over a communication network. Examples of user device comprise, but are not limited to, cellular phones, personal digital assistants (PDAs), handheld devices, laptop computers, personal computers, smart watches and the like. Additionally, the user device comprises a memory unit, a processor, a network interface card, a connecting port and the like.

The user device comprises the user agent module, wherein the user agent module is configured to generate the user interface to be displayed on the screen of the user device, and receive user input data from the user. The user agent module refers to a computer program or a routine that is configured to generate the user interface to enable communication between the system and the user. Furthermore, the user agent module comprises one or more routines, data structures, object classes, and/or protocols that support the interaction of the user device and the user. It will be appreciated that the user agent module invokes system-level code or calls to other software residing on the user device or other location communicatively coupled with the user device to perform certain functions, such as setting up a communication session between the user device, the blood glucose measuring device and/or the data aggregating arrangement. In an example, a user agent module is a software application that operates on any form of computing device, such as the user device, and that is capable of accessing static data or resource files stored in the user device, such as user-viewable hypertext documents.

Moreover, the user agent module when initiated or interacted with provides the user interface to be displayed on the screen of the user device. The user interface includes a structured set of user interface elements rendered on the screen of the user device. The user interface elements refer to visual objects that have a size and a position in the user interface. Examples of user interface elements include (but are not limited to) text blocks, labels, text boxes, list boxes, lines, and image windows, dialog boxes, frames, panels, menus, buttons, icons, and the like. In addition to size and position, the user interface elements may have other properties, such as a margin, spacing, or the like. Furthermore, the user interface elements are used by the user to interact with the user device to enter user input data. The user input data is the information provided by the user while interacting with the system via the user interface of the user device. For example, a given user interface element may include a text box that is configured to receive textual input from the user, such as a name of the user or the age of the user. In such example, the given user interface element enables the user to input the user input data and receive the user input data from the user. Optionally, a user interface element may generally be visible, though there may be times when a user interface element is hidden. Optionally, the user interface used herein is a graphical user interface (GUI).

The system comprises the blood glucose measuring device. Throughout the present disclosure, the term "blood glucose measuring device" refers to a medical device for measuring a concentration or an amount of glucose present in blood of the user. Typically, the blood glucose measuring device is a compact device having a small size enabling the user to conveniently utilise and carry the blood glucose measuring device. In an example, the blood glucose measuring device has a weight of 25 grams and a diameter of 40 millimetre. The concentration or amount of glucose present in the blood is referred to as blood glucose level. Optionally, a predefined concentration of glucose in the blood is desired for a good health of the user. In an example, a desirable blood glucose level for good health of an adult user (having an age more than 18 years) is below 100 mg/dL (milligram per deciliter) before the adult user consumes food and the blood glucose level two hours after the adult user consumes food is less than 140 mg/dL. The blood glucose measuring device enables the user to continuously measure the blood glucose levels and based on the measurements of the blood glucose levels the user may take necessary actions such as diet control, medication to maintain the desired blood glucose level. Optionally, the blood glucose measuring device accurately measures the blood glucose level in a range of 30 mg/dL (milligram per deciliter) to 600 mg/dL (milligram per deciliter). More optionally, the blood glucose measuring device accurately measures the blood glucose level in a range of 1.665 mmol/L (millimoles per liter) to 33.3 mmol/L (millimoles per liter).

The blood glucose measuring device is communicably coupled to the user device for operation. Specifically, the blood glucose measuring device is configured in a manner that the blood glucose measuring device starts or activates to perform one or more functions. Moreover, the one or more functions that are performed by the blood glucose measuring device enables measurement of the blood glucose levels of the user. In an example, the coupling of the user device with the blood glucose measuring device enables the user device to control a start of measurement of blood glucose levels. In an embodiment, the blood glucose measuring device is communicably coupled to the user device via a connecting means. The term connecting means herein refers to a wired or a wireless connection between the blood glucose measuring device and the user device via which the user device controls the operation of the blood glucose measuring device. In an example, the connecting means may be a USB (Universal Serial Bus) or MICRO USB (Universal Serial Bus) cable. In such an example, the USB (Universal Serial Bus) or MICRO USB (Universal Serial Bus) cable may be a USB (Universal Serial Bus) or MICRO USB (Universal Serial Bus) standard A connector or a USB (Universal Serial Bus) or MICRO USB (Universal Serial Bus) standard B connector or a USB (Universal Serial Bus) or MICRO USB (Universal Serial Bus) type C connector and the like. Optionally, for a connection via USB (Universal Serial Bus) or MICRO USB (Universal Serial Bus) cable, the user device and the blood glucose measuring device comprise a female connecting unit to receive a male connecting unit present at both ends of the USB (Universal Serial Bus) or MICRO USB (Universal Serial Bus) cable. In another example, the connecting means may be an auxiliary input cable. In such an example, the auxiliary input cable may have a plug of diameter 6.35 mm (millimetre), or a plug of diameter 3.5 mm (millimetre) or a plug of diameter 2.5 mm (millimetre). Optionally, for a connection via Auxiliary input cable, the user device and the blood glucose measuring device comprise a jack to receive plugs of the Auxiliary input cable for establishing a connection thereof. In yet another example, the wireless connecting means may comprise connections via Internet, Bluetooth, NFC (Near Field Communication). In such an example, the user device and the blood glucose measuring device comprise wireless connectivity modules such as Internet module, Bluetooth module, NFC (Near Field Communication) module. In another example, the connecting means may be a Lightning® (connector).

Optionally, the blood glucose measuring device comprises a UART (Universal asynchronous receiver-transmitter) interface. In such a case, a USB (Universal Serial Bus) to UART (Universal asynchronous receiver-transmitter) bridge controller is employed in the blood glucose measuring device to enable the user to connect the user device to the blood glucose measuring device via the USB (Universal Serial Bus) connecting means.

In an embodiment, the blood glucose measuring device is a passive device. The blood glucose measuring device requires power for performing its operations. Specifically, the power required by the blood glucose measuring device is provided by the user device. Moreover, the connectivity means enables the user device to provide the power to the blood glucose measuring device. In an example, the blood glucose measuring device is provided power by the user device upon receiving a start instruction from the user device. In another example, the blood glucose measuring device receives power from the user device via the USB (Universal Serial Bus) cable. In yet another example, the blood glucose measuring device receives power from the user device wirelessly via induction charging.

In an embodiment, the blood glucose measuring device does not have a screen to display any information. The blood glucose measuring device is configured to display the information to the user via the user interface displayed on the screen of the user device. For example, an error information describing the malfunction of the blood glucose measuring device may be displayed in the user interface of the user device.

Moreover, the blood glucose measuring device comprises the electronic strip port for generating the electronic signal based on the electrochemical reaction occurring on the biochemical strip removably coupled therein. Typically, the user provides a blood sample to the blood glucose measuring device. Moreover, the user obtains the blood sample by pricking a finger. In an example, a quantity of the blood sample obtained is in microliters. In another example, the blood glucose measuring device requires 0.5 microliters of blood sample for determination of blood glucose level.

Generally, the blood sample is provided by the user on the biochemical strip. Typically, the biochemical strip comprises an enzyme referred to as glucose oxidase enzyme and a chemical referred to as ferricyanide. Moreover, upon providing the blood sample on the biochemical strip, the glucose present in the blood undergoes electrochemical reaction with the glucose oxidase enzyme to produce gluconic acid. Furthermore, the gluconic acid undergoes electrochemical reaction with ferricyanide to produce ferrocyanide. The ferrocyanide produced on the biochemical strip generates electronic signals which increases the electronic power used in the electronic strip port. Consequently, a change in the electronic power provided by the blood glucose measuring device enables the determination of the electronic signal generated by the electrochemical reaction. Additionally, the removable coupling of the biochemical strip with the electronic strip enables the user to replace the biochemical strip upon the generation of the electronic signal.

Furthermore, the blood glucose measuring device comprises the temperature sensor for sensing ambient temperature. Throughout the present disclosure, the term "ambient temperature" refers to a temperature of the air in an environment comprising the user and the blood glucose measuring device. The ambient temperature is essential for determination of accurate blood glucose levels of the user. In an example, an ambient temperature may be a room temperature such as 20 degree Celsius. Moreover, the concentration of glucose present in the blood of the user varies based on the ambient temperature. Furthermore, a dependency of the concentration of glucose on the temperature results in production of an incorrect electronic signal. The blood glucose measuring device may generate an incorrect blood glucose levels based on the incorrect electronic signal. Therefore, the ambient temperature is significant in determination of correct blood glucose levels of the user. Optionally, the temperature sensor converts the ambient temperature into a corresponding electronic digital signal. Optionally, the temperature sensor is configured to accurately sense the ambient temperature in a range of 1 degree Celsius to 45 degree Celsius.

Moreover, the blood glucose measuring device comprises the control unit configured to compute the blood glucose level based on the electronic signal received from the electronic strip port and the ambient temperature received from the temperature sensor. Throughout the present disclosure, the term 'control unit' refers to a computational element that is operable to respond to and processes instructions that drive the blood glucose measuring device. Optionally, the control unit comprises, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Moreover, the term "control unit" may refer to one or more individual processors, processing devices and various elements associated with a processing device that may be shared by other processing devices. Additionally, the one or more individual processors, processing devices and elements are arranged in various architectures for responding to and processing the instructions that drive the blood glucose measuring device. Optionally, the control unit is operable to compute the blood glucose level in a processing time of less than or equal to five seconds.

In an embodiment, the control unit is configured to employ one or more derived regression equations for computing the blood glucose level. The one or more derived regression equations facilitates a relationship between the ambient temperature and the electronic signal to determine an accurate blood glucose level irrespective of the variations in the ambient temperature. In an example, the blood glucose measuring device determines the blood glucose level of a patient to be 150 mg/dL (milligram per deciliter) at an ambient temperature of 30 degree Celsius. In such an example, the blood glucose measuring device determines the blood glucose level of the patient to be 150 mg/dL (milligram per deciliter) even at an ambient temperature of 40 degree Celsius. Therefore, the one or more derived regression equations enables the blood glucose measuring device to efficiently determine a similar blood glucose level for the user even in different ambient temperature.

Moreover, the control unit is further configured to provide the user device with the blood glucose level to be displayed on the user interface. The blood glucose level is provided to the user device via the connecting means. The user device enables the user to view the blood glucose level determined by the blood glucose measuring device. In an embodiment, the user interface comprises one or more user interface elements to control the operation of the blood glucose measuring device. In an example, the one or more user interface elements enable the user to provide a wake up command to the blood glucose measuring device by clicking on a wake up text block on the user interface. In another example, the one or more user interface elements enable the user to receive an acknowledgment from the blood glucose measuring device via a green button on the user interface. In yet another example, the one or more user interface elements enable the user to receive an instruction from the blood glucose measuring device for insertion of biochemical strip. In another example, the one or more user interface elements enable the user to receive an acknowledgment from the blood glucose measuring device about acceptance of the biochemical strip. In yet another example, the one or more user interface elements enable the user to instruct the blood glucose measuring device to start operation.

The system comprises the data aggregating arrangement communicably coupled to the user device for receiving the blood glucose level and the user input data provided by the user agent module. Throughout the present disclosure, the term "data aggregating arrangement" refers to an arrangement comprising a computational entity configured to acquire, process and/or respond to the blood glucose level and the user input data provided by the user agent module of the user device. Optionally, the data aggregating arrangement includes one or more programmable and non-programmable components. Examples of the one or more programmable and non-programmable components may include memory, processor, network adapter, cabinets, crisscrossed wires, connector and the like. Moreover, the one or more programmable and non-programmable components of data aggregating arrangement are configured to host computer programs and/or routines that provide various services. In one example, the services may include providing connectivity between the data aggregating arrangement and the user device for establishing a communication session and subsequently receiving the blood glucose level and the user input data from the user agent module. In another example, the services may include providing a data repository service for storing the information related to the user. In yet another example, the services may include hosting computer programs and/or routines for processing the one or more inputs received from the user agent module. The data aggregating arrangement is communicably coupled to the user device via a data network. Examples of the data network may include, but is not limited to, one or more peer-to-peer network, a hybrid peer-to-peer network, local area networks (LANs), radio access networks (RANs), wide area networks (WANs), portions of a public network such as the Internet, a cellular network and the like. Optionally, the data aggregating arrangement and the user device are operable to exchange information related to the user carried out via any number of known protocols suitable for exchanging information including voice, video, data and combinations thereof. Examples of the protocols may include, but not limited to, Internet Protocol (IP), Wireless Access Protocol (WAP), Frame Relay, or Asynchronous Transfer Mode (ATM).

In an embodiment, the user input data comprises personal information of the user. The personal information of the user includes demographical details, connectivity details, financial details, career details, health details, and the like. In an example, the demographical details of the user may include date of birth, age, gender, address, location, number of family members, religion, citizenship, and the like; the connectivity details of the user may include a phone number, an email address of the user, and the like; the financial details of the user may include bank account number, the vendor details of which the user uses the banking services, debit or credit card number and the like; the career details associated to the user may include job designation, total amount of experience, current salary, and the like; the health details associated to the user may include weight, height, body mass index, major disorders, and the like.

In an embodiment, the personal information of the user is acquired by the data aggregating arrangement from a third-party service provider. The third-party service provider refers to one or more systems, applications, and/or a combination thereof for providing electronic content (namely, the data describing the personal information of the user) to the data aggregating arrangement via the data network. Furthermore, the third-party service provider is subscription based, i.e. the data describing the personal information of the user is provided as an online service that is accessed by the data aggregating arrangement with subscriber accounts.

In an embodiment, the user input data comprises information describing food intake of the user and its corresponding timings. The information describing the food intake of the user and its corresponding timings refers to an amount and type of the food consumed by user, and the corresponding timings refers to the time at which the amount and the type of the food is consumed by user. For example, the amount may be measured in various units such as grams, kilograms, calories and the like, and type may describe the category of food, such as organic, non-organic, vegan, vegetarian, non-vegetarian and the like. In such example, the corresponding timing may describe the time of the 24 hours at which the user is consuming the food, such as at 0600 hours, 0800 hours, 1300 hours, 1700 hours, 2000 hours and 2200 hours.

In an embodiment, the user input data comprises information describing physical activity performed by the user. The information describing the physical activity performed by the user refers to the movement of the user in one or more direction. For example, the movements may include the daily movements, such as walking, running, swimming, sleeping or other activity. It may be appreciated that a sensor arrangement may be communicatively coupled with the user device to provide data related to the physical activity performed by the user, that is further processed by the user agent application and thereafter transmitted to the data aggregating arrangement via the data network.

In an embodiment, the user input data comprises information describing medication consumed by the user. The information describing the medication consumed by the user includes the details of the one or more medicines consumed by the user. Moreover, the information describing the medication consumed by the user includes time at which the user consumes the medicine. For example, the information describing the medication consumed by the user may describe that the user consumes the medicine 'W' 20 minutes before 0600 hours, the medicine 'X' 10 minutes before 1300 hours, the medicine 'Y' 10 minutes before 2000 hours, and the medicine 'Z' 10 minutes after 2200 hours.

In an embodiment, the data aggregating arrangement includes a database, wherein the database is configured to store the received blood glucose level and the user input data at one or more specific data structure suitable for further computation. Examples of the data structure may include a table, a map, a grid, a packet, a datagram, a file, a document, a list or any other form. The database may be hardware, software, firmware and/or any combination thereof. For example, the database may include any data storage software and systems, such as, for example, a relational database like IBM DB2 and Oracle 9. Additionally, the blood glucose level and the user input data are stored in the database in the form of data elements including (but are not limited to) data records and bits of data. It will be appreciated that, the data elements associated to a given user populates the database in a specific section that is assigned to the given user The data aggregating arrangement is configured to process the blood glucose level and the user input data using one or more algorithms. The one or more algorithms are any collection or set of instructions executable by a computer or other digital system so as to configure the data aggregating arrangement to analyze the blood glucose level and the user input data. Additionally, the one or more algorithms is intended to encompass such instructions stored in storage medium such as RAM, a hard disk, optical disk, or so forth, and is also intended to encompass so-called "firmware" that is software stored on a ROM or so forth. Optionally, the one or more algorithms refer to software application. Such one or more algorithms is organized in various ways, for example the one or more algorithms includes software components organized as libraries, Internet-based programs stored on a remote server or so forth, source code, interpretive code, object code, directly executable code, and so forth. It may be appreciated that the one or more algorithms may invoke system-level code or calls to other software residing on a server or other location to perform certain functions. Furthermore, the one or more algorithms may be pre-configured and pre-integrated with an operating system of the data aggregating arrangement.

Moreover, the one or more algorithms are artificial intelligence (AI) algorithms. Specifically, the one or more algorithms are executable upon the data aggregating arrangement, and are operable to adapt and adjust their operating parameters in an adaptive manner, depending upon information that is presented thereto when executed. Thus, by learning by example from a given blood glucose level and a given user input data, neural networks and variable state engines of the artificial intelligence (AI) algorithms are thereby programmed to analyze the given blood glucose level and the given user input data. Thus, it will be appreciated that processing of the given blood glucose level and the given user input data is performed in a semi-automated or automated manner.

In an embodiment, the data aggregating arrangement is operable to employ historical recorded data including the blood glucose level and the user input data provided by the user agent module, as an input parameter to the one or more algorithms. The historical recorded data including the blood glucose level and the user input data refers to the chronologically stored data in a specific data structure including the blood glucose level and the user input data. Specifically, the historical recorded data includes each and every blood glucose level and the user input data associated to the user that was transmitted by the user agent module since a first use of the system. More specifically, the historical recorded data is the periodically saved blood glucose level reading and the user input data provided by the user agent module. For example, the first blood glucose level of a user A was L and the user input data was n1, n2, n3 and n4, the second blood glucose level of a user A was M and the user input data was n1, n2, n5 and n4, the third blood glucose level of a user A was N and the user input data was n1, n2, n3 and n6, the fourth blood glucose level of a user A was O and the user input data was n1, n2, n7 and n8, and the fifth blood glucose level of a user A was P and the user input data was n1, n2, n7 and n9. In such example, the chronologically stored data of the blood glucose levels and the user input data of the user A is the historical recorded data. Furthermore, in such example, the one or more algorithms may consider the blood glucose levels L, M, N, O and P, and the user input data n1, n2, n3, n4, n5, n6, n7, n8 and n9, and the relations between the blood glucose levels and the user input data to process the blood glucose level and the user input data, such as a real-time blood glucose level and the user input data. It will be appreciated that the database is configured to store the blood glucose levels and the user input data of the user chronologically.

In an embodiment, the one or more algorithms process the historical recorded data to determine trend in physiological condition of the user. The trend determined in the historical recorded data refers to any commonality in the physiological condition of the user. In an embodiment, the trends are determined based on a variation in the blood glucose level of the user. The variation in the blood glucose level of the user refers to the difference in the blood glucose levels of the user. For example, as mentioned in an aforesaid example the first, the blood glucose level L may be greater than blood glucose level M, the blood glucose level N may be lesser than the blood glucose level M, the blood glucose level O may be lesser than the blood glucose level P, the blood glucose level O may be lesser than N. In such an instance, the one or more algorithms are configured to process the historical recorded data to determine the physiological condition of the user.

In an embodiment, the trends are determined based on a preference provided by the user. The user interface includes one or more user interface elements that enable providing specific preference of the user. In an embodiment, preference provided by the user comprises a diet preference of the user. For example, the user may prefer to consume fruits. In an embodiment, preference provided by the user comprises a daily routine preference of the user. In an example, the daily routine preference of the user may be that the user prefers to have 8 hours of continuous sleep. In an embodiment, preference provided by the user comprises a physical restraint of the user. In an example, physical restraint of the user may be a fractured leg. Optionally, the preference provided by the user may be determined from the user input data. For example, if the user has mentioned that the user intakes food at a specific time such as 1700 hours repeatedly, the user performs physical activity for a period such as for 1 hour at 0700 hours repeatedly, or consumes medication 10 minutes after 2200 hours. In such an instance, the preference provided by the user may be considered as the user prefers to intake food at 1700 hours, perform the physical activity for 1 hour at 0700 hours, and consume medication 10 minutes after 2200 hours. The one or more algorithms analyze the user input data describing the personal information, the food intake, the physical activity, the medication consumed by the user to determine how the body of the user reacts when the blood glucose level is L, M, N, O and P, and the preference provided by the user is considered. In an example, the one or more algorithms analyze if there is a specific pattern. In such an instance, the specific pattern may be that the user is having a user is having a blood glucose level of O when the user is consuming fruits and sleeping for 8 hours in 24 hours.

Furthermore, the data aggregating arrangement processes the blood glucose level and the user input data using one or more algorithms to determine the lifestyle regime for the user and display the lifestyle regime on the user interface of the user device. The one or more algorithms are configured to generate the lifestyle regime including a list of habits and activities based on the blood glucose level, the user input data, and the trends that may enable the user to be healthy. It will be appreciated that healthy is a state of the user's body in which the body performs its vital functions normally or properly. For example, user is having a blood glucose level of O when the user is consuming fruits and sleeping for 8 hours in 24 hours. In such an example, the lifestyle regime determined by the one or more algorithms may include a 2 hours of physical activity to be performed by the user, perform food intake at 0600 hours, 0900 hours, 1200 hours, 1500 hours, 1800 hours and 2100 hours, and consume the medicine 'W' 20 minutes before 0600 hours, the medicine 'X' 10 minutes before 1200 hours, the medicine 'Y' 10 minutes before 1800 hours, and the medicine 'Z' 10 minutes after 2100 hours. In such an example, the user having the blood glucose level of O may be considered as healthy. Moreover, in such an example, the user continues to be healthy by considering the lifestyle regime determined by the one or more algorithms. Furthermore, the aforementioned information is transmitted by the data aggregating arrangement to the user device, and subsequently displayed in the user interface of the user agent module in the form of user interface elements.

DETAILED DESCRIPTION OF THE DRAWINGS

Figure 1:
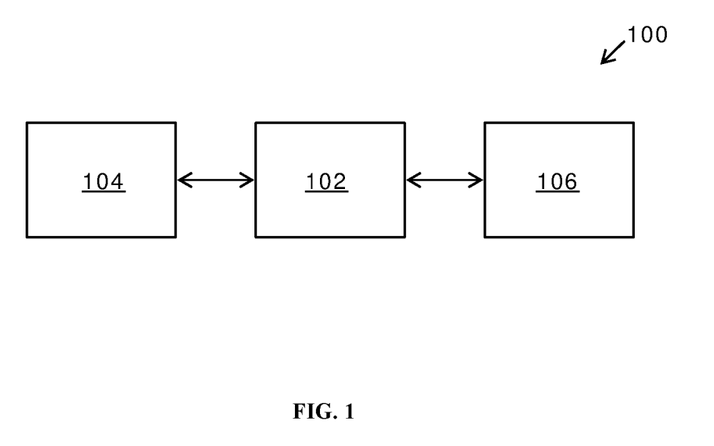
FIG. 1 is a block diagram of a system for determining a lifestyle regime for a user, in accordance with an embodiment of the present disclosure.

Referring to FIG. 1, there is shown a block diagram of a system 100 for determining a lifestyle regime for a user, in accordance with an embodiment of the present disclosure. As shown, the system 100 comprises a user device 102, a blood glucose measuring device 104, and a data aggregating arrangement 106. Moreover, the blood glucose measuring device 104 is communicably coupled to the user device 102 for operation. Furthermore, the data aggregating arrangement 106 is communicably coupled to the user device 102.

Figure 2:
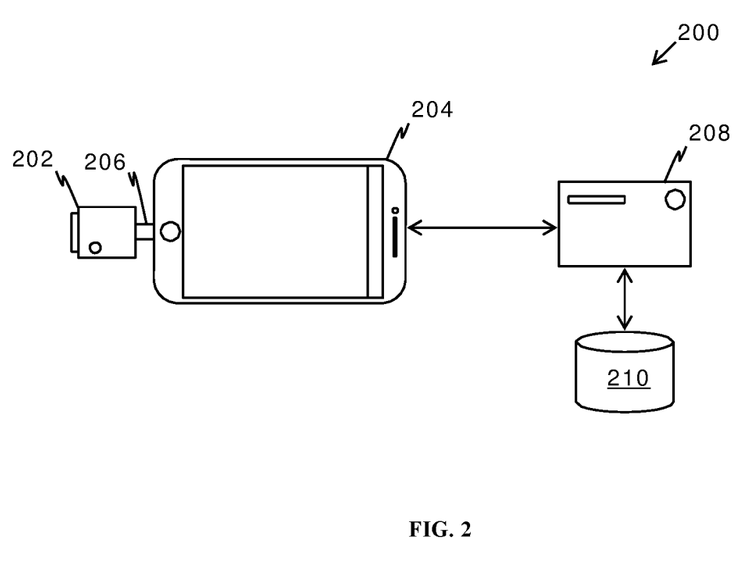
FIG. 2 is a schematic illustration of an environment for determining a lifestyle regime for a user, in accordance with an embodiment of the present disclosure.

Referring to FIG. 2, there is shown a schematic illustration of an environment 200 for determining a lifestyle regime for a user, in accordance with an embodiment of the present disclosure. As shown, the environment 200 comprises a blood glucose measuring device 202 communicably coupled to a user device 204 a connecting means 206. The user device 204 is configured to receive user input data from a corresponding user. The blood glucose measuring device 202 is configured to compute a blood glucose level and provide the user device 204 with the blood glucose level. As shown, the user device 204 is communicably coupled to the data aggregating arrangement 208. The data aggregating arrangement 208 is configured to receive the blood glucose level and the user input data from the user device 204 and store the blood glucose level and the user input data in a database 210. Moreover, the data aggregating arrangement 208 determines the lifestyle regime for the user and displays the lifestyle regime on the user device 204.

Figure 3:
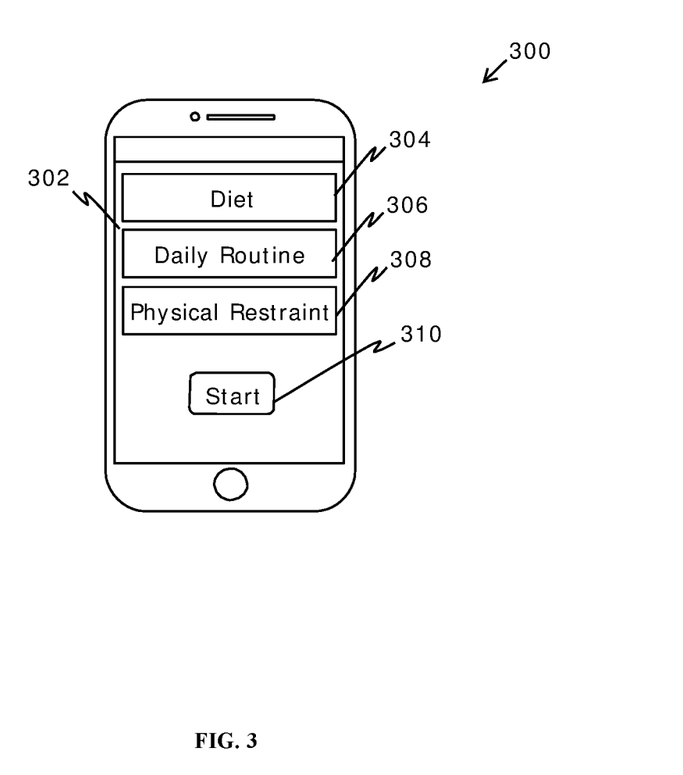
FIG. 3 is an illustration of exemplary user interface of a user device, in accordance with an embodiment of the present disclosure.

Referring to FIG. 3, there is shown an illustration of exemplary user interface of a user device 300, in accordance with an embodiment of the present disclosure. The user device 300 comprises a user agent module. Moreover, the user agent module is configured to generate a user interface 302 to be displayed on a screen of the user device and receive user input data from a user. As shown, the user interface 302 receives user input data in form of preferences depicted as a diet preference 304 of the user; a daily routine preference 306 of the user; and a physical restraint 308 of the user. Moreover, the user interface 302 comprises a user interface element 310 to control a start operation of the blood glucose measuring device.

Figure 4:
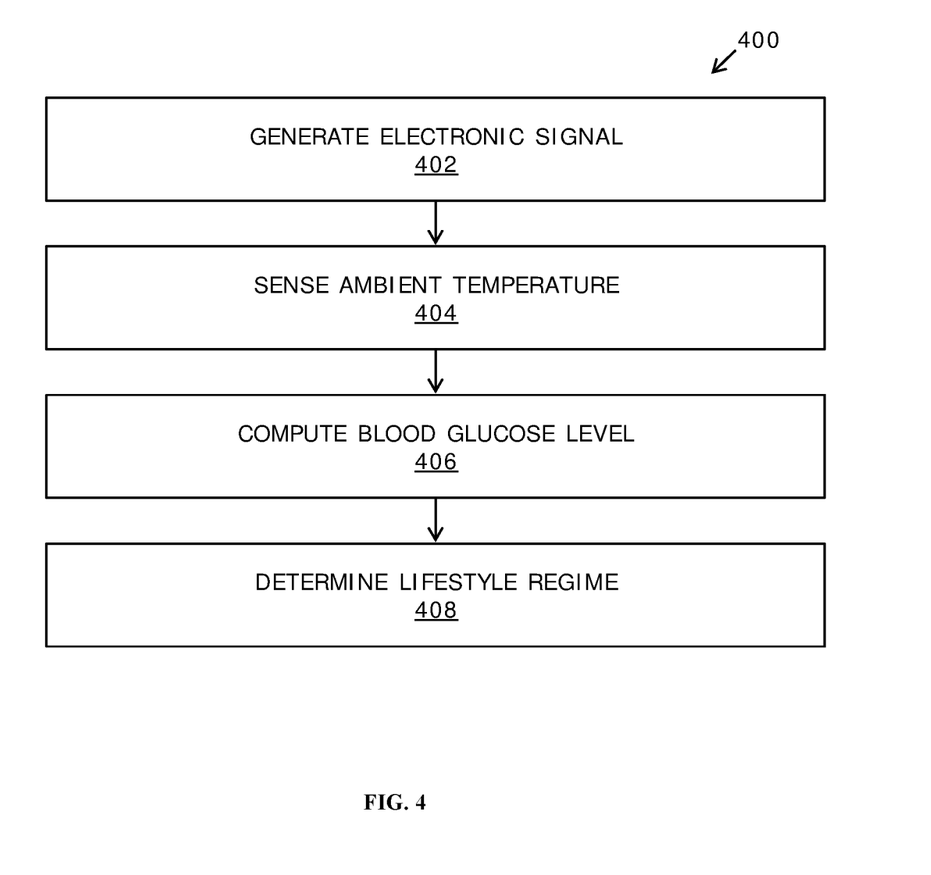
FIG. 4 is an illustration of steps of a method for determining a lifestyle regime for a user, in accordance with an embodiment of the present disclosure.

Referring to FIG. 4, there is shown an illustration of steps of a method 400 for determining a lifestyle regime for a user, in accordance with an embodiment of the present disclosure. The method 400 is implemented via a system comprising a user device, a blood glucose measuring device, and a data aggregating arrangement. The blood glucose measuring device comprises an electronic strip port, a temperature sensor, and a control unit. At a step 402, an electronic signal is generated based on an electrochemical reaction occurring on a biochemical strip removably coupled to the electronic strip port. At a step 404, an ambient temperature is sensed by the temperature sensor. At a step 406, a blood glucose level is computed, by the control unit, based on the electronic signal received from the electronic strip port and the ambient temperature received from the temperature sensor. At a step 408, the blood glucose level and the user input data are received by the data aggregating arrangement, and the blood glucose level and the user input data are processed using one or more algorithms to determine the lifestyle regime for the user and display the lifestyle regime on the user device.

The steps 402 to 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for determining a lifestyle regime for a user, the system comprising:
    a user device comprising a user agent module, wherein the user agent module is configured to generate a user interface to be displayed on a screen of the user device, and receive user input data from the user; a blood glucose measuring device communicably coupled to the user device for operation, wherein power is provided to the blood glucose measuring device by the user device upon receiving a start instruction from the user device, wherein the blood glucose measuring device comprising:

an electronic strip port for generating an electronic signal based on an electrochemical reaction occurring on a biochemical strip removably coupled therein, wherein upon the generation of the electronic signal, removable coupling of the biochemical strip with the electronic strip port enables the user to replace the biochemical strip;

a temperature sensor for sensing ambient temperature; and a control unit configured to compute a blood glucose level based on the electronic signal received from the electronic strip port and the ambient temperature received from the temperature sensor, wherein the control unit is further configured to provide the user device with the blood glucose level to be displayed on the user interface; and a data aggregating arrangement communicably coupled to the user device for receiving the blood glucose level and the user input data provided by the user agent module, and to process the blood glucose level and the user input data using one or more algorithms to determine the lifestyle regime for the user and display the lifestyle regime on the user interface of the user device, wherein the one or more algorithms are a set of instructions executable by the system, wherein the data aggregating arrangement is operable to employ historical recorded data, including the blood glucose level and the user input data provided by the user agent module, as an input parameter to the one or more algorithms, wherein the historical recorded data is periodically saved in a chronological order in a data structure, wherein the one or more algorithms are pre-configured and pre-integrated with an operating system of the data aggregating arrangement, wherein the one or more algorithms process the historical recorded data to determine trends in physiological conditions of the user, wherein the one or more algorithms are artificial intelligence (AI) algorithms, wherein the AI algorithms are operable to adapt and adjust operating parameters of the AI algorithms in an adaptive manner based on the blood glucose level and the user input data, wherein neural networks and variable state engines of the AI algorithms are configured to analyze the blood glucose level and the user input data, wherein the one or more algorithms determines a reaction of the user to a given blood glucose level based on the user input data, and wherein the user input data comprises:

information describing food intake of the user and its corresponding timings, and information describing medication consumed by the user and timings of consuming the medication with respect to the corresponding timings of the food intake.

2. The system of claim 1, wherein the blood glucose measuring device is a passive device.

3. The system of claim 1, wherein the user interface comprises one or more user interface elements to control the operation of the blood glucose measuring device.

4. The system of claim 1, wherein the control unit is configured to employ one or more derived regression equations for computing the blood glucose level.

5. The system of claim 1, wherein the user input data further comprises:

(i) personal information of the user; and
(ii) information describing physical activity performed by the user.

6. The system of claim 5, wherein the personal information of the user is acquired by the data aggregating arrangement from a third-party service provider.

7. The system of claim 1, wherein the trends are determined based on:

(i) a variation in the blood glucose level of the user; and
(ii) a preference provided by the user.

8. The system of claim 7, wherein the preference provided by the user comprises at least one of:

(i) a diet preference of the user;
(ii) a daily routine preference of the user; and
(iii) a physical restraint of the user.

9. The system of claim 1, wherein the blood glucose measuring device is communicably coupled to the user device via a connecting means.

10. A method for determining a lifestyle regime for a user, the method being implemented via a system comprising:

generating, by a user agent module of a user device, a user interface to be displayed on a screen of the user device, and receive user input data from a corresponding user;

generating, by an electronic strip port of a blood glucose measuring device, an electronic signal based on an electrochemical reaction occurring on a biochemical strip removably coupled therein, wherein the blood glucose measuring device is communicably coupled to the user device for operation, wherein power is provided to the blood glucose measuring device by the user device upon receiving a start instruction from the user device, and wherein upon the generation of the electronic signal, removable coupling of the biochemical strip with the electronic strip port enables the user to replace the biochemical strip;

sensing, by a temperature sensor of the blood glucose measuring device, ambient temperature;

computing, by a control unit of the blood glucose measuring device, a blood glucose level based on the electronic signal received from the electronic strip port, and the ambient temperature received from the temperature sensor, wherein the control unit is further configured to provide the user device with the blood glucose level to be displayed on the user interface; and processing, by a data aggregating arrangement using one or more algorithms, the blood glucose level and the user input data to determine the lifestyle regime for the user and display the lifestyle regime on the user interface of the user device, wherein the data aggregating arrangement is communicably coupled to the user device for receiving the blood glucose level and the user input data provided by the user agent module, wherein the one or more algorithms are a set of instructions executable by the system, wherein the data aggregating arrangement is operable to employ historical recorded data, including the blood glucose level and the user input data provided by the user agent module, as an input parameter to the one or more algorithms, wherein the historical recorded data is periodically saved in a chronological order in a data structure, wherein the one or more algorithms are pre-configured and pre-integrated with an operating system of the data aggregating arrangement, wherein the one or more algorithms process the historical recorded data to determine trends in physiological conditions of the user, wherein the one or more algorithms are artificial intelligence (AI) algorithms, wherein the AI algorithms are operable to adapt and adjust operating parameters of the AI algorithms in an adaptive manner based on the blood glucose level and the user input data, wherein neural networks and variable state engines of the AI algorithms are configured to analyze the blood glucose level and the user input data, wherein the one or more algorithms determines a reaction of the user to a given blood glucose level based on the user input data, and wherein the user input data comprises:

information describing food intake of the user and its corresponding timings, and information describing medication consumed by the user and timings of consuming the medication with respect to the corresponding timings of the food intake.

* * * * *